June 2, 1964 SABURO SHOJI ETAL 3,135,834

AUTOMATIC TELEPHONE CALLING SYSTEM

Filed Nov. 20, 1959 3 Sheets-Sheet 1

INVENTOR.
Saburo Shoji
Shoichi Hasegawa
BY
[signature]
AGT.

INVENTOR.
Saburo Shoji
BY Shoichi Hasegawa
Leon M. Strauss
AGT.

June 2, 1964 SABURO SHOJI ETAL 3,135,834

AUTOMATIC TELEPHONE CALLING SYSTEM

Filed Nov. 20, 1959 3 Sheets-Sheet 3

INVENTOR.
Saburo Shoji
Shoichi Hasegawa
BY Leon M. Strauss
Agt.

3,135,834

AUTOMATIC TELEPHONE CALLING SYSTEM

Saburo Shoji and Shoichi Hasegawa, Tokyo-to, Japan, assignors to Kanda Tsushin Kogyo Kabushiki Kaisha, Tokyo, Japan Filed Nov. 20, 1959, Ser. No. 854,366
Claims priority, application Japan Jan. 14, 1959
5 Claims. (Cl. 179—90)

The invention relates to an automatic telephone calling system, wherein a plurality of frequently called telephone numbers are stored in a memory section and selectively taken out therefrom as the occasion arises, by manipulating an appropriate push button, selected from a plurality of push buttons, thereby automatically connecting the calling-subscriber's telephone set with the central office.

One object of the invention is to provide an automatic telephone calling system wherein a telephone number storage drum is provided, which storage drum includes a plurality of storage elements (each storage element containing a telephone number to be dialed), and means for replacing any of the storage elements with another storage element as the occasion arises.

Another object of the invention is to provide an automatic telephone calling system, wherein the storage or memory drum, including said storage elements, is of a compact, sturdy and reliable design.

Another object is to provide an automatic telephone calling system, wherein a time delay relay adapted to restore all other relays therein to their original inactive positions after a pre-determined number of recalls of the called subscriber's telephone set have been completed by the automatically calling-subscriber's telephone set.

Another object is to provide an automatic telephone calling system, wherein an effective interference-preventing means is provided.

Still another object is to provide an automatic telephone calling system, wherein the storage means provides initiating electrical signals, from which regular shaped dialling pulses are electronically regenerated.

Other, and more specific objects, features and advantages of the invention will appear from the description given hereinafter, taken in connection with the accompanying drawings illustrating an illustrative embodiment of this invention.

Figures 1, 2, 3:
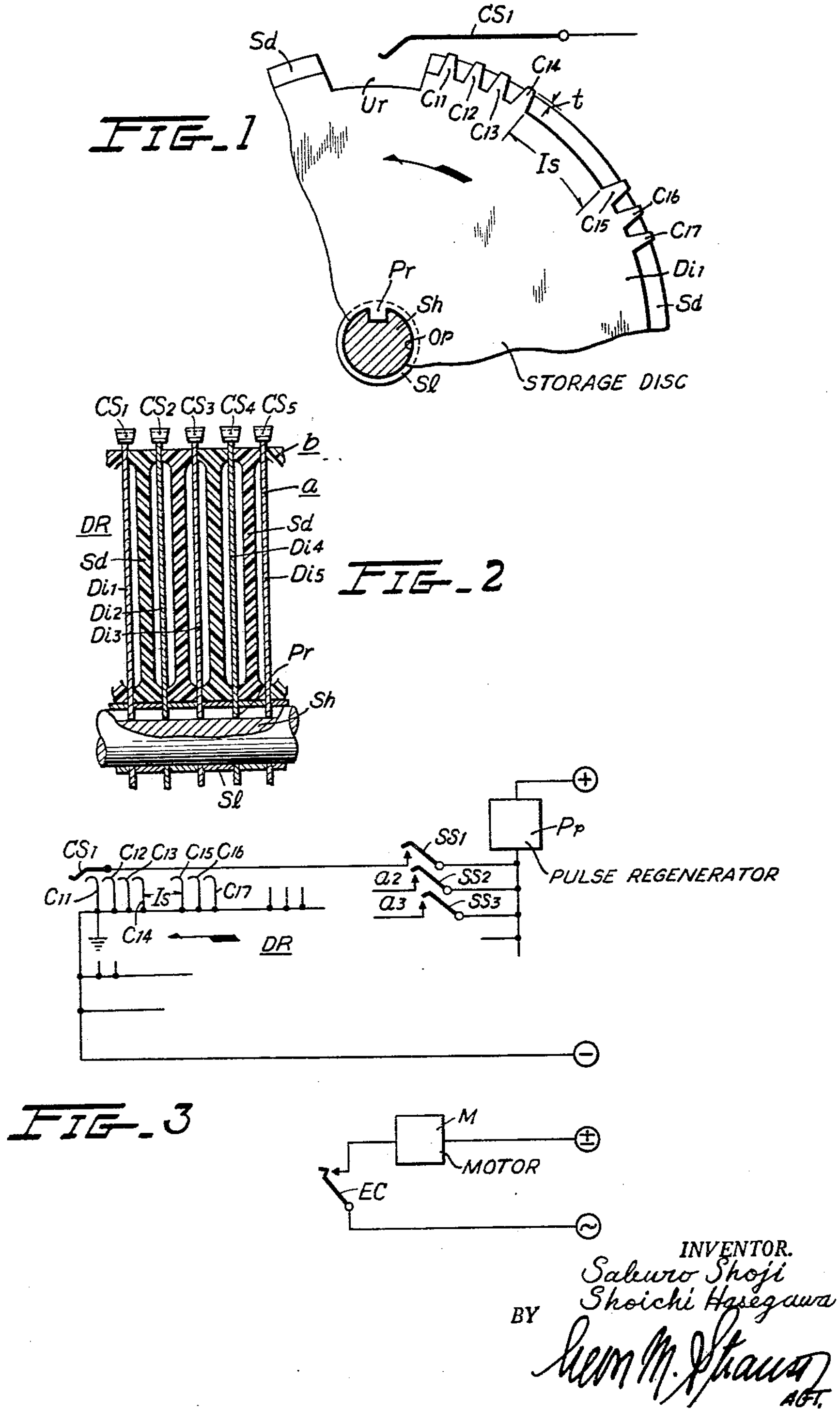
FIGURE 1 represents a side view of part of a storage, or memory, element, which is a toothed disc adapted to store a specific telephone number which has associated therewith a spring contact, a spacer disc and a mounting shaft.
FIGURE 2 is a sectioned elevation view of a storage drum comprising a number of the storage, or memory, elements shown in FIGURE 1.
FIGURE 3 shows a wiring diagram of the storage drum, and a wiring diagram of a control circuit including a motor 4 rotatably driving said storage drum.

Now, referring to FIGURES 1, 2 and 3, the telephone number storage, or memory, device will be described more in detail. This storage device is made in the shape of a drum DR, comprising a number of electrically conductive toothed discs $Di_1$, $Di_2$, $Di_3$ . . ., each containing a telephone number stored therein. Since these discs are of similar design, except as to the number and spacing of the teeth formed on the peripheral surface of each disc, it will suffice to explain in detail substantially any one of them; e.g., the disc designated by reference character $Di_1$ (see FIG. 1).

The disc $Di_1$ is provided with groups of projecting teeth $c_{11}$ . . . $c_{14}$, $c_{15}$ . . . $c_{17}$ . . . formed integral therewith and on the peripheral surface of the disc. These discs are arranged in parallel, but separated from each other through the intermediary of a spacer disc S*d* inserted between adjacent discs as shown at FIG. 2. The drum DR is rotated at a constant speed as shown by an arrow in FIGURES 1, 3 and 5, respectively. $CS_1$, $CS_2$ . . . denote spring contacts, each being adapted to make electric contact with one of said conductive discs D*i* (see FIGS. 1 and 2). $SS_1$, $SS_2$ . . . designate different telephone number selector push buttons for actuating the different spring contacts $CS_1$, $CS_2$ . . ., while a block P*p* designates a pulse regenerator, which will be described more in detail hereinafter.

The depression of any one of the push buttons (e.g., $SS_1$) causes the contact EC (FIG. 3) to close. This action may be accomplished electrically as with a relay coil associated with the contact EC or the closing of contact EC may be linked mechanically with each of the individual push buttons $SS_1$ . . . $SS_4$. . . . The electrical and mechanical ways of accomplishing the switching activities are well known. When the contact EC closes, the motor M begins to rotate, thereby causing the drum DR to rotate at constant speed in the direction indicated by the arrows shown at FIGS. 1, 3 and 5. By this rotation, spring contact $CS_1$ successively makes contact with teeth $c_{11}$, $c_{12}$, $c_{13}$ and $c_{14}$. The pulse generator P*p* will thus generate four pulses in succession. Thereafter, there is a short dwelling interval or pause as diagrammatically represented by character I*s* in FIGURE 1, followed by a further transmission of three pulses by contacting of spring contact $CS_1$ with teeth $c_{15}$–$c_{17}$ in succession. In the similar way, a number of pulse groups, each of which corresponds to a digit contained in the telephone number under consideration, will be sent out.

The detailed construction of the drum DR is seen from the elevational view illustrated in FIGURE 1. Each elemental disc D*i* is made from a thin metal plate and has a central opening O*p* adapted to receive a driving shaft S*h* and has a small projection P*r* engageable in a corresponding key groove formed on the shaft. Originally, each of said discs D*i* is formed with a full number of teeth around the whole peripheral surface thereof. Then a plurality of idle spaces I*s* between successive teeth groups are formed by breaking off certain tooth projections thereby leaving a desired arrangement of selected teeth groups remaining. The spacer disc S*d* inserted between each couple of toothed discs D*i* is made from a suitable insulating plastic material and have a diameter smaller than the discs D*i*. As is shown at FIG. 1, the spacer disc S*d* has a smaller radius than the disc D*i*; the difference being designated by *t* in the drawing figure. As shown at FIGS. 1 and 2, there is a thin metallic sleeve S*l* which receives therethrough the shaft S*h*, said sleeve serving as an electrical conducting means to provide current flow between successive toothed discs D*i*.

When assembling, toothed discs D*i* and spacers S*d* together with sleeves S*l* are alternatively mounted on the shaft S*h* and firmly tightened in a rigid assembly forming a drum DR by tightening a fixing nut (not shown) on the screw end (not shown) of said shaft. A number of separate fixing bolts and nuts may be also employable, in place of one as above mentioned.

When it is desired to replace any one or more of said toothed discs D*i* by those having different arrangement and number of pulsing teeth corresponding to different telephone number or numbers, it can be carried out in an easy and simple way after removing the above-mentioned fixing nut. In the case of such a reassembling, no special precautions are necessary in connection with tooth pitch and/or starting point, thus no adjustment therefor being necessary. There is provided a relatively large circumferential recess *Ur* common to a couple of toothed disc and spacer. This space serves for the prevention of contact with spring contact CS, when the drum DR is being disassembled or reassembled.

Figure 4:
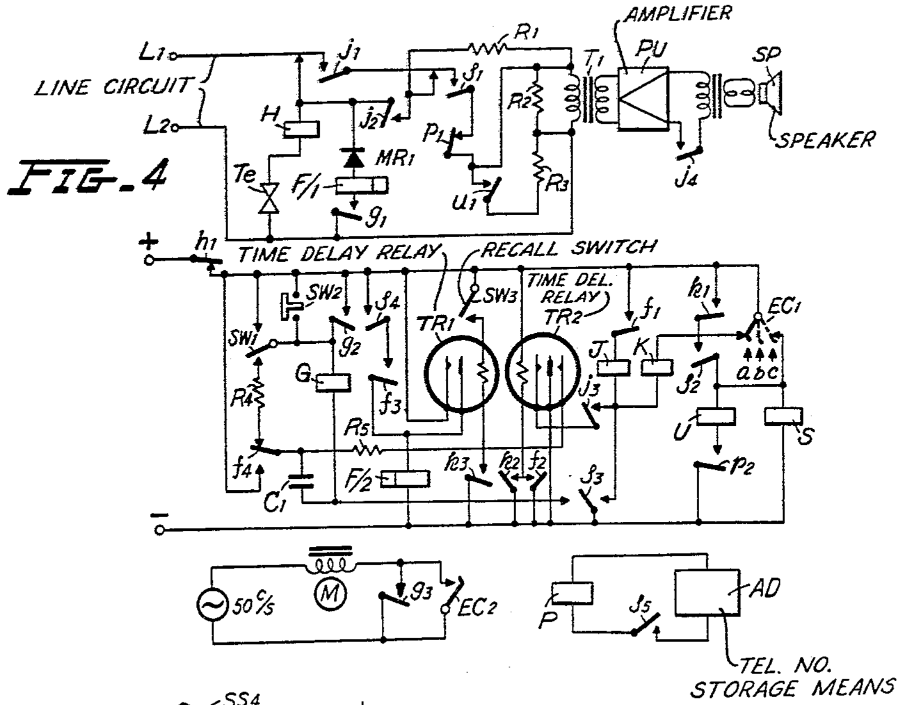
FIGURE 4 is a simplified schematic diagram of the automatic telephone set calling system according to the present invention.

Next, referring especially to FIGURE 4, reference characters $L_1$, $L_2$ represent in unison a subscriber's line circuit coming from an automatic switch board, not shown, of a telephone office; PU an amplifier; SP a loudspeaker electrically coupled therewith through a transformer $T_1$; AD a telephone number storage and interpreting means, including the abovementioned drum DR and capable of storing a plurality of predetermined telephone numbers, which are expected to be frequently utilized by the subscriber; M the synchronous-motor already described and driven by energization with an A.C. current supplied from a commercial current source not shown, and rotatable at a constant speed, as said before, to drive the said means, thereby interpreting any selected one of the abovementioned, stored telephone numbers, the working mode of which has been already explained in connection with FIGURES 1–3.

Contacts $EC_1$ and $EC_2$ shown in FIGURE 4, are operated by a cam (not shown), which rotates in synchronism with the motor M, in such a way that when the storage device is not used, contact $EC_1$ positions at *a* and contact $EC_2$ is interrupted, while when the motor M and the storage device AD begin to rotate in synchronism, contact $EC_1$ becomes make instantaneously at *c* and thereafter is positioned at its neutral position *b*, thus being interrupted from the both sides thereof, and contact $EC_2$ is maintained "on" during a whole revolution of the storage device and returns to its original position upon completion of every one revolution. In FIGURE 4, reference characters G, H, J, K, P, S and U represent a plurality of relay coils, and $g_1, g_2 \ldots h_1, h_2 \ldots$ show related relay contacts. F/1 and F/2 denote respective coils wound on a twin coil relay F, and $f_1, f_2 \ldots$ represent the corresponding contacts thereof. $TR_1$ and $TR_2$ represent time delay relays, which are respectively so designed that upon flowing of current through the related heat elements, as shown, the developed heat causes bimetal members comprised in the relays to deflect into a curved shape, respectively, resulting in the related relay contacts turned to "on" with a predetermined time lag counted from the beginning of the current flow. $SW_1$ denotes a starting switch, which becomes make instantaneously by moving it upwardly according to the orientation in FIG. 4 and making contact with the upper stationary contact thereof, when any selected one of push button switches $SS_1$, $SS_2$ . . . is depressed manually, said switch, however, returning thereafter to its original position.

Under the normal working conditions of telephone set T*e*, that is, when the system according to this invention is set inoperative, the set T*e* is connected through a relay H in circuit with lines $L_1$ and $L_2$, and the subscriber may manipulate the set or apparatus T*e* as in the usual way to transmit and receive telephone messages. If the subscriber depressed any one of the abovementioned selector push buttons, say, $SS_1$, corresponding to any selected one of stored telephone numbers, switch $SW_1$ operates, in cooperation therewith, moving upwards in FIGURE 4 and thus being transferred to the opposite stationary contact. This operation will establish a circuit leading from the positive current source denoted by "+," through contact $h_1$, switch $SW_1$, relay G, contact $S_3$ to the negative current source denoted by "—," resulting in relay G being energized, which is thereafter latched. At the same time, contact $g_3$ closes and thus the motor M starts to run and continues its running by the self-holding action of contact $EC_2$. With the starting of motor M, contact $EC_1$ becomes instantaneously make with stationary contact *c*, thus operating relay S, which is then self-held by its contact $s_2$. At the same time, contact $s_3$ moves to the right in FIGURE 4, thereby relay G is restored and relay J is operated. This relay J is thereafter self-held by its contact $j_3$, while its contacts $j_1$ and $j_2$ are operated. By this operation there is completed a circuit from line $L_1$ through contact $j_1$ to contacts $s_1$ through contacts $p_1$ through contacts $u_2$ through $R_3$ and then through the parallel coupled resistor $R_2$ and the primary coil of the transformer $T_1$ to line 2, and the related line switch or line finder, not shown, in the telephone office is thereby operated. The thus transmitted dial tone is amplified through coupling transformer $T_1$ by amplifier PU and, therefore, audible from the speaker SP.

With rotation of motor M, a series of current pulses representing the first digit of the selected telephone number are transmitted from storage and interpreting device AD through contact $s_5$ to relay P, which operates in the order of said pulses, which repetitive operation causes contact $p_1$, which is at the present instant operatively connected to the line circuit, to be intermittently operated in the same order as the aforementioned series of pulses, and thus delivers the same pulses through lines $L_1$ and $L_2$ to the office switch board. The relay U is a slow-operating one and designed to operate during the delivery period, so that current does not flow through the transformer $T_1$ in the course of said period, thus effectively preventing clicks by the pulses from taking place.

After a pause, say about 0.7 second, a second group of pulses corresponding to the second digit of the telephone number being called are sent out in the similar way as above described, followed by the third, fourth and further succeeding pulse groups successively sent out after every pause, until the storage device has completed a complete revolution. At this time, contact $EC_2$ is automatically opened to stop the motor M, and contact $EC_1$ is simultaneously turned to position *a* to operate relay K, which opens thereby its contact $k_1$ and thus relay S is restored and its contact will return to the position as shown in FIGURE 4. By this action, a circuit comprising $L_1$—$j_1$—$s_1$—$j_2$—H—T*e*—$L_2$ and that containing $L_1$—$j_1$—$s_1$—$R_1$—$T_1$—$L_2$ are established. In this case, however, since the handset of telephone set T*e* is not yet taken up by the operator's hand, the abovementioned former circuit cannot be completed on account of the interrupted condition of the hook switch (not shown) attached to the telephone set T*e*, while through the latter circuit a ring back tone incoming from the already connected line circuit is passed through transformer $T_1$ to speaker SP and issued out in the form of audible tone.

Now, when the other subscriber thus called takes up his handset by his hand and begins to speak, the speech is audible from speaker $SP_1$ so that the calling subscriber may raise his handset in response thereto. By this manipulation the relay H and thus the related contact $h_1$ will be opened, resulting in that all other relays, but H, return to their original position and all the related circuits are restored to their mutual relations as shown in FIGURE 4.

On the other hand, when the abovementioned pulse transmission has been completed and the called subscriber or the trunk circuit is busy, a busy-back tone is audible from speaker SP. In this case, a recall switch $SW_3$ is manually turned "on," so that a circuit including $SW_3$—$TR_1$—$k_3$ is established and the heat element attached to relay $TR_1$ is energized, so that the bimetal comprised therein is heated. Thus, after a predetermined time interval, say, several seconds, contact $TR_1$ is closed to operate relay F. The contact $f_1$ is thereby opened and thus relay J is restored to its original position. The related contact $j_3$ thus operates to restore relay K. Since contacts $j_1$ and $j_2$ are restored so that the original circuit including $L_1$—$j_1$—H—T*e*—$L_2$ is again established, and the office switch board will return to its normal conditions by the hook switch in the telephone set T*e*. When contact $k_3$ is restored to its open position the bimetal member of relay $TR_1$ begins to cool down, said relay being preferably so adjusted that it opens again after a predetermined time interval, say, 20 seconds. After this idle period of 20 seconds, during which the line circuit has been opened, relay F is restored to its original position, thereby contact $f_4$ returning upwardly in the drawing, so that the electric charge accumulated in condenser $C_1$ is released through contact $f_4$, resistor $R_4$ and switch $SW_1$ to relay G, which thereby operates and self-held thereafter by means of its contact $g_2$.

If the other subscriber's telephone set or the trunk circuit is still busy, the motor M begins to start as was already described, and several groups of pulses representing the selected telephone number are transmitted to the office switch board. If, at the completion of the operating cycle, the called subscriber responds, the present subscriber may take up his handset and begin to communicate. If, on the contrary, the called telephone set is yet busy, the present machine will operate without any special manipulation after about 15 seconds to close again relay $TR_1$, thereby the line circuit will be opened in the above mentioned manner, thus a third automatic telephone call taking place.

If the busy condition should not be altered, more several times of automatic calling may be carried out as desired. But, since infinitely repeated callings of this kind are useless and annoying, and thus limitation thereto should preferably be made. In the machine according to this invention, time delay relay $TR_2$ is arranged to provide such a limitation. More specifically, current will flow through a heating element attributed to this relay when either relay F or K is effective, thereby the bimetal comprised therein is heated and bent as in the conventional way by the heat. This time lag relay $TR_2$ may be, for instance, so adjusted, that after, say, five recalls have occurred as in the above mentioned manner, the contact thereof is changed over or transferred to the opposite position. By this transfer movement of contact $TR_2$, both relays J and K are restored to their original position, while the charge accumulated in condenser $C_1$ is discharged through resistor $R_5$, thus preventing relay G from starting and ensuring all relays to be restored to their original position. On the other hand, said relay $TR_2$ serves, in addition to the abovementioned function, as an accident-preventing means by terminating the time lag in such a way that in the case of recall switch $SW_3$ kept remained open and when the handset has not been raised for a considerably long time from the telephone set, the relay $TR_2$ operates after a predetermined dwell period, say, about three minutes to restore all the relays and to open the line circuit.

With use of a conventional Stroger automatic switch board, model "A," the bell does not ring at the instant of incoming call signal and the ringing signal is effective for a second followed by a dwell for two seconds and so on. Even when the calling circuit is established during aforementioned dwell time, the bell can not ring. It will be clear from the foregoing, that by pushing-in any selected one of push buttons, or by initiating the aforementioned recalling operation, ineffective pulses may be transmitted to the receiver of the other subscriber's telephone set under being called. The coil F/1 is provided for the prevention of such a conflicting operation, which may be otherwise caused to take place, when the incoming of call signal and the outgoing of pulses from the present system should happen to take place simultaneously.

In the case of incoming call signal and with use of the aforementioned "A"-type switch board, the polarity of lines $L_1$ and $L_2$ is reversed, resulting in the line $L_1$ negatively polarized and in the line $L_2$ positively polarized and thus making ready for operating the coil F/1. When, in this case, any selected one of push buttons is depressed or a starting of the recalling action takes place, relay G is operated and its contact $g_1$ becomes make, thereby current flowing through coil F/1 and relay F becoming energized, by which the contact $f_3$ is closed. By the operation of relay G, the motor M starts as in the manner hereinbefore disclosed, relay S is energized, and current will flow also through coil F/2 by way of contact $s_4$, thereby relay F is retained, while its contact $f_1$ is opened, thus relay J remaining in operative. Therefore, groups of pulses issuing out of relay P in the course of rotation of motor M are not transmitted through the line circuit and thus ineffective. The telephone set T*e* is kept in connection with the line circuit and the related bell (not shown) will ring at the incoming of a call signal. Then, the handset is raised from the telephone set, thereby relay H being energized by current, and all other relays but H being restored to their normal position.

Figure 5:
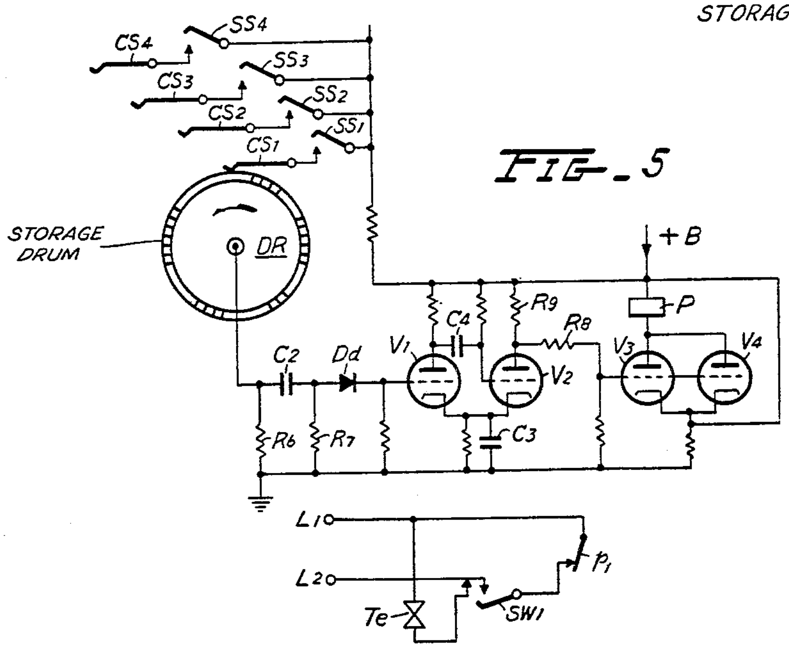
FIGURE 5 represents a circuit diagram showing a pulse regenerator.

Finally, the pulse regenerator P*p* will be fully explained in connection with FIGURES 5 and 6.

When in order to read out and send or call any selected one of stored telephone numbers, one of the push buttons, say, $SS_1$ is depressed to make, the motor M starts as in the previously described way and the change-over or transfer switch $SW_1$ is turned "off," so that the telephone set T*e* is isolated from the line circuit including $L_1$ and $L_2$, again in the manner as already referred to, while the pulse-transmitting contact $P_1$ is thereby connected with the line circuit.

Figure 6:
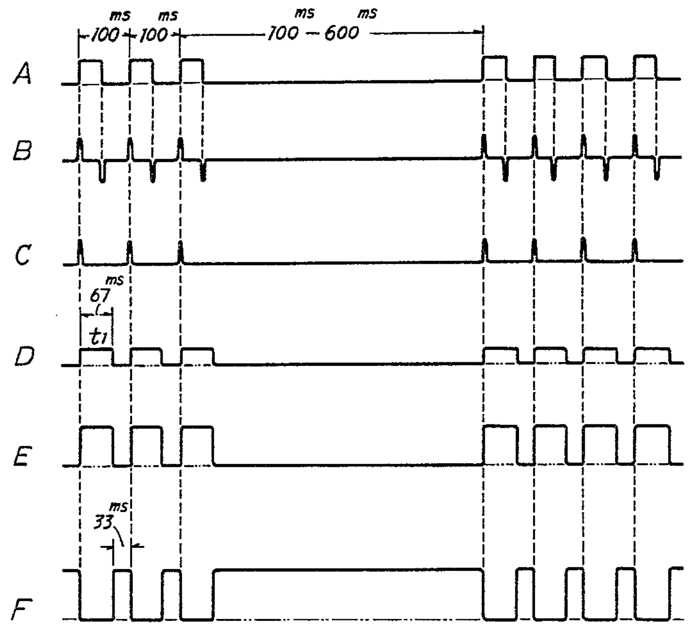
FIGURE 6 is a wave diagram showing the relative time relation of various pulses generated in the regenerator of FIG. 5.

With rotation of the drum $DR_1$ and thus, of a toothed disc, for instance, $Di_1$, spring contact $CS_1$ intermittently contacts with teeth on the disc, thereby groups of pulses in the form of a rectangular wave as shown FIGURE 6, "A," are applied to condenser $C_2$.

These pulses are transformed by means of a differential circuit comprising condenser $C_2$, resistors $R_6$ and $R_7$, into trigger pulses as illustrated in FIGURE 6, "B," which are passed to a diode D*d*, thus positive trigger pulses only be added to the grid of a tube $V_1$. Tubes $V_1$ and $V_2$ are included in a monostable multivibrator circuit, wherein positive trigger pulses applied to the grid of tube $V_1$ are transformed into a rectangular wave as shown in FIGURE 6, "D," which are then applied through resistor $R_8$ to the grids of tubes $V_3$ and $V_4$. The width $t_1$ of the rectangular wave can be determined by the time constant of combination of condenser $C_4$ and resistor $R_9$, and in the present embodiment a width, about 67 microseconds, is employed. This value determines in turn the make ratio of pulses transmitted from the final stage contact $P_1$.

The rectangular wave developed in the abovementioned multivibrator is amplified by the D.C.-amplifier including tubes $V_3$ and $V_4$ in enough amplified wave form as shown in FIGURE 6, "E," to drive the relay P. When relay P is driven, its contact $p_1$ is intermittently operated and transmits groups of pulses as shown in FIGURE 6, "F," to the line circuit including $L_1$ and $L_2$. When the called subscriber responds, switch $SW_1$ is restored to connect the telephone set T*e* to lines $L_1$ and $L_2$, thus being ready for communicating with the called subscriber.

It is clear from the foregoing, that an automatic telephone calling apparatus adapted to send out groups of pulses corresponding to any selected one of stored telephone numbers therein would comprise substantially the abovementioned storage drum DR and switching device. But, with this device, a constant make-ratio of outgoing pulses and a suitable formation thereof are rather difficult. In order to obtain the desired accurate results, the storage device would become highly voluminous. To avoid this, the employment of the abovementioned pulse-regenerating device is highly valuable. With this system, the storage device provides only electrical signals, from which, however, regular and suitably-shaped pulses can be derived through electronical regeneration.

Although for the purpose of explaining the invention a certain particular embodiment thereof has been disclosed, obvious modifications will occur to a person skilled in the art, and it is not desired to be limited to the exact details shown and described.

The invention having thus been described, that which is believed to be new and for which protection by Letters Patent is desired, is:

1. A system, for automatically dialing any of a plurality of called-subscriber's telephone-set stations from a calling-subscriber's telephone-set station through a central office to which each called-subscriber's telephone-set station and the calling-subscriber's telephone-set station are connectable by corresponding line circuits, comprising: a telephone number storage device at the calling-subscriber's telephone-set station, said storage device comprising a plurality of conductive storage discs mounted for rotation on a rotatable common shaft, each storage disc having a predetermined arrangement of conductive teeth thereon representing the telephone number of a different called-subscriber's telephone-set station; a motor operable for rotating said common shaft and said plurality of storage discs mounted thereon; a plurality of switching means, each switching means being intermittently operable by the moving successive teeth of a particular rotating storage disc; a voltage source; a plurality of selector switches, each selector switch being in series with a different one of said switching means and said voltage source, said motor being operated in response to actuation of any selector switch, the actuation of a particular selector switch connecting said voltage source to a particular switching means whereby the intermittent operation of said switching means transmits an intermittent group of voltage pulses corresponding to the telephone number being called through the particularly selected storage disc; first circuit means coupled with said storage disc plurality for converting said intermittent group of pulses into a corresponding number of trigger pulses; second circuit means coupled with said first circuit means, including a mono-stable multivibrator, for converting said trigger pulses into rectangular pulses of constant width; means for amplifying said rectangular pulses; and, a pulse generator driven by said amplified pulses for transmitting said amplified pulses to the central station through the calling-subscriber's line circuit for transmission to the called-subscriber's telephone-set station through the called-subscriber's corresponding line circuit.

2. The system as claimed in claim 1, wherein said first circuit means to generate trigger pulses comprises a differentiating circuit.

3. The system, according to claim 2, further comprising a diode coupled with said differentiating circuit for passing positive trigger pulses to said second circuit means.

4. The system, according to claim 1, further comprising a plurality of non-conductive spacers, a spacer being situated between adjacently arranged discs on said common shaft, said discs and spacers being provided with access openings for preventing unintentional actuation of said switching means.

5. The system, according to claim 1, further comprising: additional circuit means, automatically operative after a predetermined time period from the end of the transmission of said amplified pulser by said pulse generator, for again operating said motor whereby another like group of voltage pulses is transmitted for conversion by said first and second circuit means, amplification by said amplifying means and transmission by said pulse generator to recall said called-subscriber's telephone-set station.

References Cited in the file of this patent

UNITED STATES PATENTS

| | | |
|---|---|---|
| 2,880,278 | Vandenberg | Mar. 31, 1959 |
| 2,921,142 | Tinus | Jan. 12, 1960 |